(12) United States Patent
Rosemarine et al.

(10) Patent No.: US 11,663,107 B2
(45) Date of Patent: May 30, 2023

(54) DATA PROCESSING SYSTEM PERFORMANCE MONITORING

(71) Applicant: Arm Limited, Cambridge (GB)

(72) Inventors: Elliot Maurice Simon Rosemarine, Cambridge (GB); Rachel Jean Trimble, Cambridge (GB)

(73) Assignee: ARM LIMITED, Cambridge (GB)

( * ) Notice: Subject to any disclaimer, the term of this patent is extended or adjusted under 35 U.S.C. 154(b) by 404 days.

(21) Appl. No.: 16/797,530

(22) Filed: Feb. 21, 2020

(65) Prior Publication Data
US 2021/0263826 A1    Aug. 26, 2021

(51) Int. Cl.
  *G06F 11/34* (2006.01)
  *G06N 3/063* (2023.01)
  *G06F 9/30* (2018.01)
  *G06F 9/38* (2018.01)
  *G06F 18/214* (2023.01)

(52) U.S. Cl.
  CPC ...... *G06F 11/3409* (2013.01); *G06F 9/30098* (2013.01); *G06F 9/3867* (2013.01); *G06F 18/214* (2023.01); *G06N 3/063* (2013.01)

(58) Field of Classification Search
  CPC .................................................. G06F 11/3409
  See application file for complete search history.

(56) References Cited

U.S. PATENT DOCUMENTS

| | | | |
|---|---|---|---|
| 8,762,694 B1 * | 6/2014 | Zou ...................... | G06F 9/4843 712/244 |
| 11,281,967 B1 * | 3/2022 | Volpe ..................... | G06N 3/049 |
| 2017/0212844 A1 * | 7/2017 | Williams ............. | G06F 11/3419 |
| 2019/0286971 A1 * | 9/2019 | Che ........................ | G06N 3/0481 |
| 2021/0200580 A1 * | 7/2021 | Yasin ...................... | G06F 9/321 |

\* cited by examiner

*Primary Examiner* — Michael J Metzger
(74) *Attorney, Agent, or Firm* — EIP US LLP

(57) ABSTRACT

A computer implemented method, performed in a data processing system comprising a performance monitoring unit. The method comprises receiving a set of computer-readable instructions to be executed by the data processing system to implement at least a portion of a neural network, wherein one or more of the instructions is labeled with one or more performance monitoring labels based upon one or more features of the neural network. The method further comprises configuring the performance monitoring unit to count one or more events occurring in one or more components of the data processing system based on the one or more performance monitoring labels.

11 Claims, 10 Drawing Sheets

DATA PROCESSING SYSTEM PERFORMANCE MONITORING

BACKGROUND OF THE INVENTION

Field of the Invention

The present disclosure relates to methods, apparatus and computer software for monitoring the performance of data processing in a data processing system. The disclosure has particular, but not exclusive, relevance for monitoring the performance of data processing within a neural processing system.

Description of the Related Technology

Performance monitoring units (PMUs) are used in data processing systems containing computation processors such as central processing units (CPUs) to measure and analyze their performance during processing workloads. A PMU can be used to monitor the performance of code executed by computation processors in the interest of analyzing the performance to identify sections of the code which result in unoptimized processing. The code is either compiled by a compiler or assembled by an assembler to form a set of low-level instructions used by the hardware to carry out processing. A PMU is useful when the instructions are executed in a non-determinate path of execution to give insight into the hardware resources used by the software; the values of the counters can be inspected at the end of the workload or they can be used to indicate that the workload should be interrupted for debugging or inspection when a particular counter value is reached.

Neural processing systems may contain a neural processing unit (NPU). NPUs, also known as neural processors, neural network accelerators and AI accelerators, are used to accelerate machine learning algorithms. Many neural networks contain convolutional layers, where an input feature map (IFM) is convolved with convolutional filter data to produce an output feature map (OFM). These layers often consume a large amount of processing. Neural networks also contain other layer types such as input, output, recurrent neural network, deconvolution, pooling, and fully connected. A convolutional neural network (CNN) typically contains multiple convolution layers, with the OFM of one layer often being used as the IFM of the next layer. These layers are typically processed in a deterministic manner, and by including specialized electronic circuitry designed for one or more specified neural network architectures, NPUs process input data, such as image data, more efficiently than general purpose processors.

SUMMARY

According to a first aspect of the present disclosure, there is provided a computer implemented method, performed in a data processing system comprising a performance monitoring unit, the method comprising:
receiving a set of computer-readable instructions to be executed by the data processing system to implement at least a portion of a neural network, wherein one or more of the instructions is labeled with one or more performance monitoring labels based upon one or more features of the neural network;
counting, using a counting element of the performance monitoring unit that is operable to count a plurality of events, the number of one or more events that occur in one or more hardware components of the data processing system and based on are associated with a performance monitoring label of the one or more performance monitoring labels.

According to a second aspect, there is provided a data processing system comprising:
storage arranged to store a set of computer-readable instructions to be executed by the data processing system to implement at least a portion of a neural network, wherein one or more of the instructions is labeled with one or more performance monitoring labels based upon one or more features of the neural network;
one or more components for processing data based on the set of instructions;
a performance monitoring unit; and
a counter element configured to count the number of a plurality of events that occur in the one or more hardware components of the data processing system and are associated with a performance monitoring label of the one or more performance monitoring labels.

DETAILED DESCRIPTION OF CERTAIN INVENTIVE EMBODIMENTS

Figure 1A:
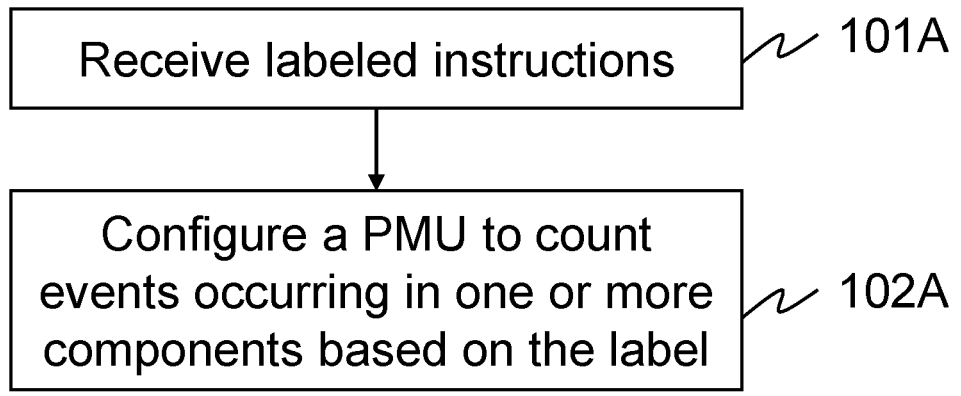
FIG. 1A illustrates a flow diagram representing a method of configuring a performance monitoring unit to count one or more events in one or more components of a data processing system in accordance with a first example of the present disclosure.

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples. Herein, a computer-readable instruction, also referred to as an instruction, is a computer-readable instruction for one or more operations of processing circuitry.

For data processing systems containing certain computation processors such as neural processing units (NPUs) the scheduling of the execution of instructions is deterministic. This means that the instructions are executed in a determined order which is unchanging every time the same set of instructions is executed. Typically, an NPU processes whole neural networks autonomously, without interruption.

Data processing systems comprising an NPU and performance monitoring unit (PMU) in accordance with different examples can receive computer-readable instructions in different forms before being adapted to be compatible with a performance monitoring process. Adaptation to be compatible with a performance monitoring process comprises assigning performance monitoring labels which are then utilized in the performance monitoring process. Herein, performance monitoring labels may be referred to as labels for conciseness. Computer-readable instructions without such adaptation will be referred to as unlabeled instructions throughout this disclosure. It will be appreciated that unlabeled instructions may be comprised of different code types which include but are not limited to source code and assembly source code without departing from the scope of this disclosure.

Computer-readable instructions after adaptation for performance monitoring will be referred to as labeled instructions throughout this disclosure. The set of labeled instructions may comprise a set of instructions where one or more of the instructions are labeled, and preferably where a plurality of the instructions are labeled. The set of labeled instructions may comprise units of work in an order of execution. It will be appreciated that labeled instructions may be comprised of different code types which include but are not limited to compiled code and assembled code without departing from the scope of this disclosure.

Unlabeled instructions may contain a set of instructions to implement a neural network which is used to process data. The neural network is constructed from various neural network layer types. An example of a neural network layer is a convolutional layer, in which an input feature map (IFM) is convolved with a filter generating an output feature map (OFM). The IFM may comprise image data. In one example, unlabeled instructions comprise source code. When the NPU processes layers of the neural network, it will do so using instructions where the neural network layers have been broken down into units of work which may not be carried out in the same order that is shown in the unlabeled instructions. For example the NPU may execute a unit of work corresponding to a first part of a first layer being processed followed by executing a second unit of work corresponding to a first part of a second layer being processed before a third unit of work is executed corresponding a second part of the first layer being processed. The execution path travels from the first layer to the second layer and then back to the first layer of the neural network.

The unlabeled instructions may be compiled by a compiler or assembled by an assembler to produce labeled instructions which comprise units of work for the NPU to execute in a certain order, to implement the neural network. The deterministic nature of the execution of these labeled instructions by an NPU means that when unlabeled instructions are compiled or assembled, the order of the units of work contained within the labeled instructions is optimized to maximize the efficiency of the NPU processing the neural network. This may be achieved by the compiler or assembler modelling the execution order of the units of work before determining the optimal execution path.

The NPU will therefore execute units of work corresponding to different layers of the neural network in a manner that may appear unpredictable to a developer of the unlabeled instructions or user of performance monitoring software. For example, determining that a given layer of the neural network performs poorly is hard to conclude when the units of work associated with that layer is interspersed with units of work for other layers of the neural network. The NPU may also process units of work from different layers simultaneously through the use of multiple computation engines processing in parallel. For example, a convolution operation from one layer of the neural network may be performed in one computation engine at the same time as a pooling layer is performed in another. The labeled instructions, or a computation processor executing the labeled instructions, may indicate that a portion of the neural network is to be processed by the NPU, while other portions of the neural network are to be processed by other computation processors such as a central processing unit (CPU).

The discussed processing properties of data processing systems with computation processors such as an NPU, has a profound impact on the known methods of performing performance monitoring. To fully analyze the performance of a data processing system executing a process, it is beneficial for the method of performance monitoring where a PMU is utilized in a way that has no measurable effect on the process being performed. If supervisory software were to be used in combination with a computation processor such as the NPU in the same manner as it is used for data processing systems with known computation processors then the supervisory software would be unable to reconfigure a PMU to count events between layers of the neural network without impacting the performance of the processing of the neural network, as the processing moves back and forth between layers of the neural network.

If units of work are processed in parallel through the use of multiple computation engines then stalling one computation engine to prevent it from starting to process a unit of work which is to be monitored to reconfigure the PMU will mean that other computation engines will continue to process other units of work resulting in a different overall performance for the NPU depending on when the PMU is reconfigured. Waiting for all compute engines to become idle to reconfigure the PMU before commencing the processing of units of work in the computation engines also results in a different overall NPU performance when taking into consideration the systems interaction with storage circuitry. For example, data will be read and written to storage circuitry such as dynamic random-access memory (DRAM) at a particular rate and if the processing is paused then the traffic latencies will appear reduced compared to if the process were being carried out without performance monitoring. Herein, the rate at which data is read from storage memory is referred to as read beats. The rate at which data is written to storage memory is referred to as write beats. It is preferable that a PMU takes up a minimal amount of chip space as it may be present in a commercial data processing system where non-developer consumers may not have any use for the PMU. The examples demonstrated in this disclosure offer a solution to the discussed problems of performance monitoring.

FIG. 1A illustrates a flow diagram representing a method of configuring a performance monitoring unit to count one or more events in one or more components of a data processing system in accordance with a second example of the present disclosure. The data processing system may be a neural processing system containing an NPU. At step 101A of the flow diagram the data processing system receives a set of labeled instructions to be executed by the data processing system to implement at least a portion of a neural network. The set of labeled instructions comprise instructions which have been assigned performance monitoring labels. These may have been previously assigned following the method shown in FIG. 1B and may have been received from a computer communicatively coupled to the data processing system. The labeled instructions may comprise units of work in an order to be executed by the data processing system to implement the neural network.

At step 102A a PMU is configured to count events occurring in one or more components of the data processing system, based on the labels assigned to the set of labeled instructions. A PMU may comprise of one or more PMU counters which are configured to increase a counter value when an event occurs with a particular label in the components of the data processing system. A PMU counter may comprise an event register, a label register and a counter value. The event register and label register may be storage circuitry which contains data corresponding to an event or a label respectively. The PMU is configured by changing the event register and/or label register to contain one or more target events or target labels. An event and label may be generated by a hardware component of the data processing system upon executing a unit of work. The generated event and label will then be compared to the event register and label register to determine whether to count the event.

Figure 1B:
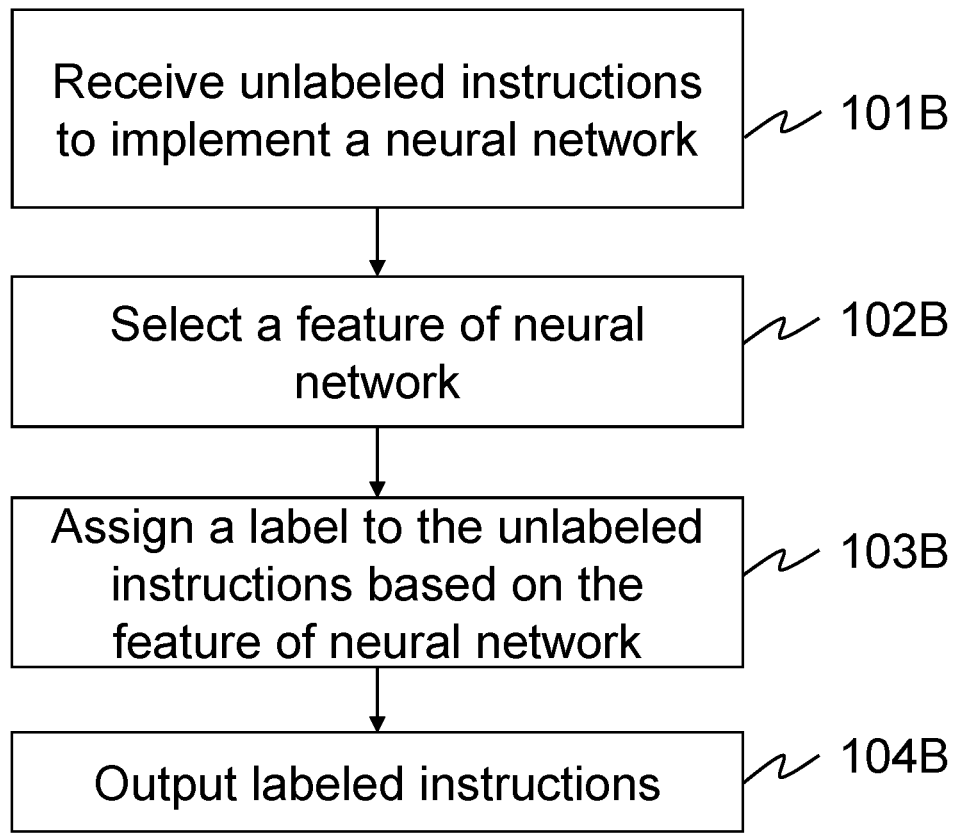
FIG. 1B illustrates a flow diagram representing a method of configuring a performance monitoring unit to count one or more events in one or more components of a data processing system in accordance with a second example of the present disclosure.

FIG. 1B illustrates a flow diagram representing a method of configuring a performance monitoring unit to count one or more events in one or more components of a data processing system in accordance with a second example of the present disclosure. The data processing system may be a neural processing system containing an NPU. At step 101B of the flow diagram the data processing system receives a set of unlabeled instructions to be executed by the data processing system to implement at least a portion of a neural network. The set of unlabeled instructions may be received in the form of source code which has been written by a user. The user may be a developer of the unlabeled instructions. The unlabeled instructions may be received from a computer which is communicatively coupled to the data processing system. The unlabeled instructions may be executed to implement an application that uses a neural network such as a convolutional neural network (CNN) to carry out the processing of data. For example, a CNN may process image data to identify features contained within the image data. The neural network may be constructed from neural network layers such as convolutional, pooling, recurrent neural network, deconvolution, pooling, and fully connected layers. The unlabeled instructions may be compiled or assembled by a compiler or assembler to generate labeled instructions in the form of compiled or assembled code. The compiler or assembler may be part of a performance monitoring software package. The labeled instructions in the form of compiled or assembled code comprise a set of low-level instructions which can be used by hardware components contained in the data processing system to carry out processing. As discussed previously, the labeled instructions in the form of compiled or assembled code comprise a set of instructions which contains units of work in an order of execution. The units of work originate from the different layers of the neural network. A layer of the neural network may be made up from a plurality of units of work. The order of the units of work to be processed will be determined during compilation or assembly of the unlabeled instructions by the compiler or assembler and will be chosen such as to optimize the efficiency of the processing of the neural network as carried out by the NPU, according to the unlabeled instructions. It should be noted that to fulfill a performance monitoring task, the labeled instructions may need to be executed multiple times. A performance monitoring task may include one or more aspects of the neural network to be monitored to gain an understanding of the performance of the neural network. In the example of the received set of unlabeled instructions taking the form of source code, the unlabeled instructions may be compiled or assembled once to generate labeled instructions comprising units of work and the labeled instructions will be executed multiple times without being recompiled or reassembled.

At step 102B of the flow diagram a feature of the neural network is selected. In one example, the feature of the neural network is a layer of the neural network such as a convolutional layer. In a convolution layer of the neural network an IFM is convolved with a filter to produce an OFM. In a further example the feature of the neural network is a processing pipeline containing a series of neural network operations, such as an IFM being convolved with a filter to produce an OFM which is then pooled and finally processed with an activation function such as a rectified linear unit (ReLU). In another example, the feature of the neural network is a processing tile of the neural network, which includes a plurality of related units of work which each make up only part of each of a plurality of layers of the neural network. The feature may be selected by a user who has determined which parts of the unlabeled instructions corresponding to aspects of the neural network which they are most interested in being monitored. The user may select the feature by using user interface software such as a graphical user interface (GUI) which may be part of a performance monitoring software package. The feature may also be determined by the performance monitoring software package which has predetermined the optimal features to be selected in order to optimally monitor the performance of the neural network. The optimal features may be determined through expertise of performing performance monitoring of neural networks being processed by the data processing system.

At step 103B of the flow diagram a label is assigned to the unlabeled instructions based on the selected feature of the neural network. The performance monitoring label is utilized during the performance monitoring process. In one example, the labels are assigned to the unlabeled instructions after compilation or assembly, generating the labeled instructions comprising units of work with which labels can then be assigned. The label may be data corresponding to an identifier or ID. In one example, a three-bit field may be utilized to allow for up to eight unique labels to be attached to different units of work contained within the labeled instructions during one execution. In a further example a single bit is utilized to label the units of work with a 'count' or 'don't count' label during one execution. In one example, the data processing system comprises an NPU. The set of labeled instructions which are used by the NPU to process units of work comprise partial instructions and parameters. The combination of these partial instructions and parameters create a unit of work. A label may be assigned to the labeled instructions based on a feature of the neural network by adding an identifier parameter to the unit of work corresponding to the selected feature. In one example, the selected feature is a layer of the neural network. The units of work associated with the selected layer of the neural network will comprise an identifier parameter added to the combination of partial instructions and parameters. A plurality of different identifier parameters may be added to the units of work, with each identifier parameter corresponding to a feature of the neural network. In one example, there is an identifier parameter corresponding to every layer of the neural network added to each unit of work. At step 104B the labeled instructions are output. The labeled instructions may be generated by a first computation processor comprising the data processing system and then output to be received and executed by a second computation processor comprising the data processing system.

After step 104B the labeled instructions can be received and the method of FIG. 1A can be carried out. In one example, the selected feature of the neural network is a convolution layer of the neural network. The event register is configured to contain a target event corresponding to a convolution process. The label register is configured to contain a target label corresponding to the convolution layer of interest. When the NPU processes units of work associated with the convolution layer of interest, the units of work will have a label to identify that they originate from the convolution layer interest. As the units of work correspond to the convolution layer, the units of work will be processed by the NPU using a computation engine which will perform a convolution between an IFM and filter. When a convolution is performed by the computation engine, data indicating that a convolution event is occurring will be generated. This event will be sent to the PMU with the label associated with the unit of work. When reaching the PMU, the event and label will be compared to the one or more target events or one or more target labels contained within the event register and label register of the PMU counter respectively. When the event and associated label sent to the PMU both match the target event and target label contained in the respective register the counter value will be increased. In the present example, an increase of the counter value indicates that a convolution event has occurred which corresponds to the convolution layer of interest.

Figure 2:
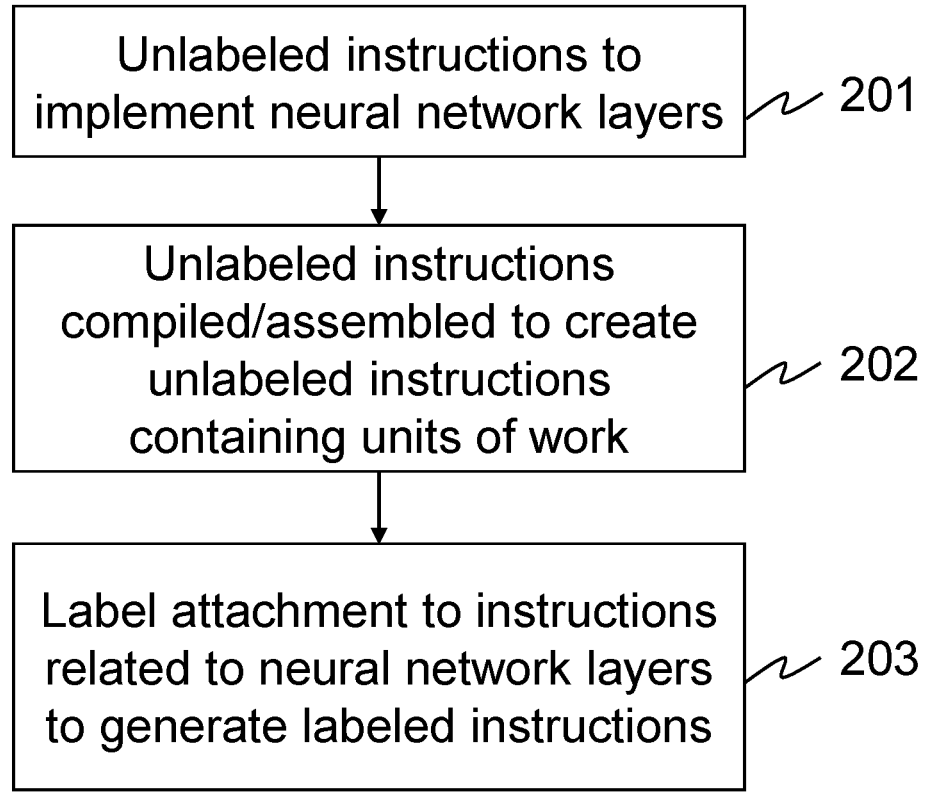
FIG. 2 illustrates a flow diagram representing a method for receiving a set of unlabeled instructions to implement a neural network, selecting a feature of the neural network and assigning a label to the set of unlabeled instructions based on the feature in accordance with an example of the present disclosure.

FIG. 2 illustrates a flow diagram representing a method for receiving a set of unlabeled instructions to implement a neural network, selecting a feature of the neural network and assigning a label to the set of labeled instructions based on the feature in accordance with an example of the present disclosure. In the present example, at step 201 of the flow diagram unlabeled instructions in the form of source code to implement a neural network with layers is received. The selected feature of the neural network is a layer of the neural network. It may be determined that a unique label should exist for every layer of the neural network and in turn the units of work associated with each layer of the neural network. This may be determined by a user and implemented via a performance monitoring software package through a user interface such as a GUI. The performance monitoring software package may also have predetermined a unique label should exist for every layer of the neural network as it may have been programmed to execute an optimal performance monitoring task. A performance monitoring task typically comprises one or more aspects of the neural network to monitor when the neural network is being processed. This performance monitoring task may have been predetermined using expertise of monitoring the performance of instructions to implement neural networks when being processed by a data processing system containing an NPU and PMU. The performance monitoring software package may be able to identify layers of the neural network from the unlabeled instructions. At step 202 of the flow diagram the set of unlabeled instructions is then compiled or assembled by a compiler or assembler contained within the performance monitoring software package to determine the set of labeled instructions comprising units of work. The order of the units of work may be determined by the compiler or assembler, or other software contained within the performance monitoring software package by modelling the most efficient execution path for the data processing system to process the neural network. The units of work contained within the labeled instructions, when processed by the hardware components of the data processing system may trigger events which are sent to the PMU. At step 203 of the flow diagram labels are attached to units of work contained within the labeled instructions which correspond to the layers of the neural network. The compiler or assembler, or other software contained within the performance monitoring software package may also perform the label attachment to units of work originating from the layers of the neural network by first identifying the layers of the neural network from the unlabeled instructions and attaching a unique label to the unit of works corresponding to the layer of the neural network. The label attached to the unit of work will be sent to the PMU along with the associated event when the unit of work is processed by the hardware component of the data processing system.

It should be noted that the labeled instructions to be executed may comprise a unit of work which reads data contained in storage circuitry. This unit of work may not be labeled. The data may comprise a batch of instructions to be processed which are labeled instructions. A batch of instructions typically comprises a set of instructions to be executed in a series of processes without manual intervention.

Figure 3:
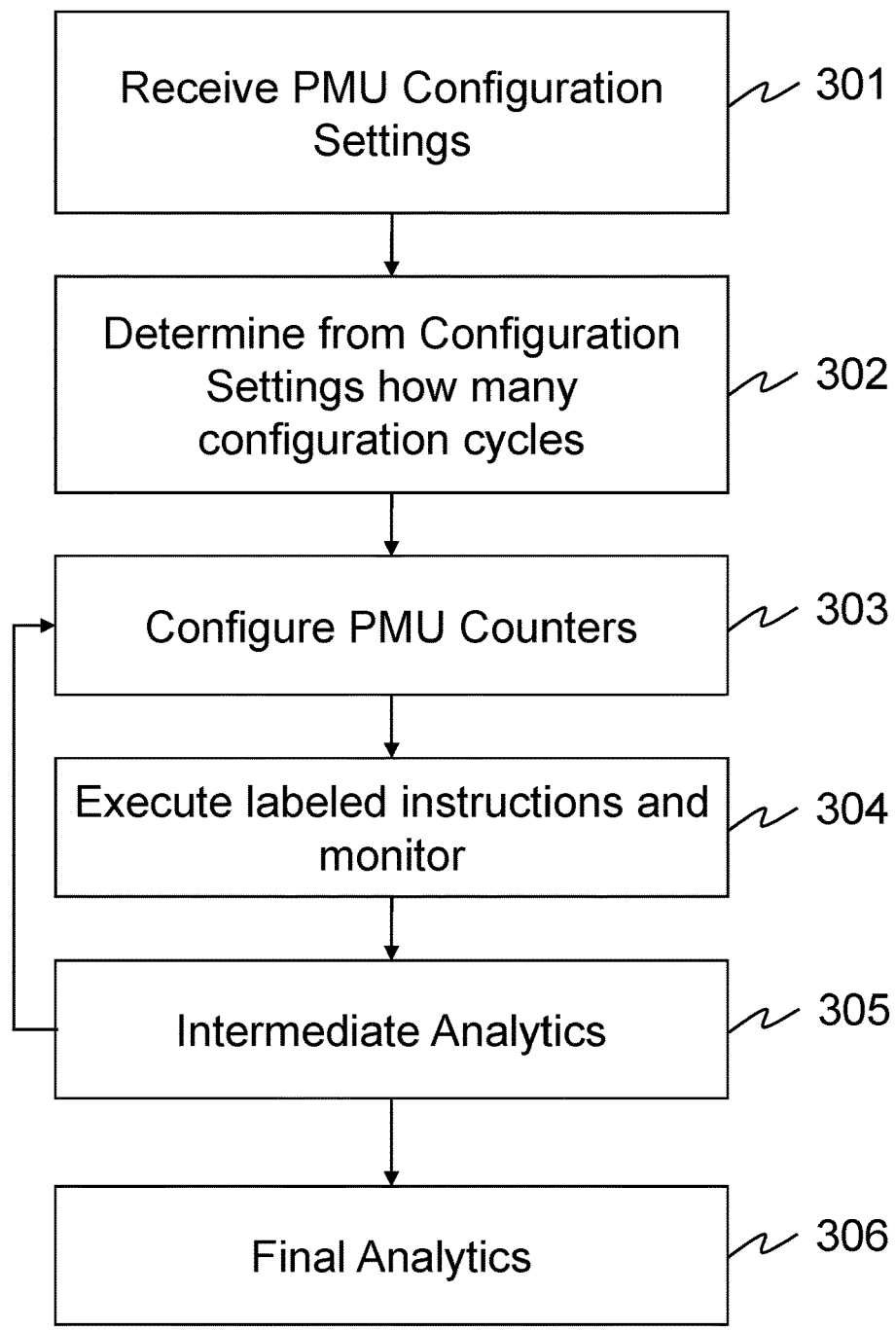
FIG. 3 illustrates a flow diagram representing a method of performing performance monitoring on a set of instructions to implement a neural network processed by a data processing system in accordance with an example of the present disclosure.

FIG. 3 illustrates a flow diagram representing a method of performing performance monitoring on a set of unlabeled instructions to implement a neural network processed by a data processing system in accordance with an example of the present disclosure. At step 301 PMU configuration settings are received by the data processing system containing a PMU. The PMU configuration settings may be used by a performance monitoring software package to determine how the PMU is configured. The PMU configuration settings may comprise configuration data. The PMU configuration settings may also be used to determine configuration data. The PMU configuration settings may be selected by a user using a user interface such as a GUI contained within the performance monitoring software package. The PMU configuration settings may also be predetermined using expertise of monitoring the performance of instructions to implement a neural network when processed by a data processing system containing an NPU and PMU. The PMU configuration settings may comprise one or more aspects of the neural network which are to have their performance monitored. An aspect of the neural network can then be used to determine a selected feature and label instructions based on the selected feature. The PMU configuration settings may be used to determine configuration data such as one or more target events and one or more target labels to be loaded into the event register and label register respectively of the PMU counter. The one or more target events and one or more target labels may be determined by considering one or more associated features and events comprising the aspects of the PMU configuration settings.

In one example, the PMU configuration settings may indicate that the processing of the neural networks interaction with storage circuitry is to be monitored as an aspect of the neural network to be used to determine a selected feature. The monitoring may be performed for example, by monitoring the direct memory accesses (DMA) read beats of a layer of the neural network. The event is the DMA reading data and the feature is the layer of interest of the neural network. The PMU configuration settings may be used to determine a target event indicating that a DMA component has read data and a target label which has the same label as is associated with the layer of interest of the neural network. It may be that it is of interest to monitor DMA read beats for one or more layers of the neural network. In this case, the PMU configuration settings are used to determine a plurality of target labels which will match the labels associated with the one or more layers of interest of the neural network. Each of the plurality of labels will be associated with the event of the DMA reading data. An event and an associated label form a set to monitor one aspect of the neural network. In more complex configurations, a set to monitor one aspect of the neural network may comprise a plurality of labels and/or a plurality of events. Monitoring the DMA read beats helps to evaluate the bandwidth required by a specific layer. The PMU configuration settings may indicate another PMU counter is configured to monitor the DMA read beats of layers of the neural network without a label or with a different label to a single layer of interest. In the case of monitoring DMA read beats of layers of the neural network with a different label to a single layer of interest, this may be achieved by having one unique label attached to units of work associated with the single layer of interest and another unique label attached to the units of work associated with every other layer of the neural network. Having two PMU counters configured in this way will allow the analytics software of the performance monitoring software package to determine the bandwidth of the layer of interest relative to the bandwidth of the rest of the neural network. Summing the two provides the total bandwidth usage for the neural network. In a further example, the configuration settings may indicate that DMA writes to storage circuitry are to be monitored by one of the PMU counters. The PMU configuration settings may indicate that DMA read or write beats are to be monitored which are associated with specific hardware components such as a programmable layer engine (PLE) or multiply accumulate computation engine (MCE), which components are described in further detail below.

In another example, the PMU configuration settings indicate that a PMU counter is to be configured to monitor active cycles of hardware components such as the MCE for a layer of the neural network as an aspect of the neural network to be used to determine a selected feature. Active cycles may be determined to be cycles in which a hardware component is processing data. A cycle corresponds to the execution of a single unit of work. A cycle may correspond to a plurality of units of work being executed at the same time in parallel. This will allow the analytics software of the performance monitoring software package to evaluate the complexity of the layer of the neural network. The PMU configuration settings may also indicate that another PMU counter is to be configured to monitor stall cycles in the MCE for the same layer of the neural network. A stall cycle may correspond to a unit of work which is unable to be executed this cycle due to the possibility of an incorrect calculation. For example, in order for the unit of work to be processed, other data in the same pipeline may first need to be computed. This will allow the analytics software to evaluate the two PMU counters to determine the total length of time for the processing of the layer by taking into account the number of cycles and by comparison understand if a reasonable utilization of the MCE is achieved or if for some reason the layer experiences an unexpectedly high stall rate. This information can be used to allow the user to determine that the unlabeled instructions associated with the layer may need editing for optimization of the neural network processing. The PMU configuration settings may also indicate that active cycles are to be monitored for a particular single MCE or for a plurality of MCEs. The PMU configuration settings may indicate that weight decoder activity for an MCE is to be monitored where weights are the values of elements of a filter. The PMU configuration settings may indicate that active cycles are to be monitored for other hardware components such as a PLE. The PMU configuration settings may indicate that convolutions where the data comprises zero elements is to be monitored.

The PMU configuration settings may be used to determine a plurality of sets of associated one or more target events and one or more target labels. The PMU configuration settings may be used to determine a simple configuration, in which each set comprises one target event is to be loaded into the event register and one target label is to be loaded into the label register of each of the PMU counters. The hardware components of the data processing system may be configured to send only one event and one associated label per cycle. The PMU configuration settings may comprise a complex configuration, in which it is determined each set contains one or more target events are loaded into the event register and one or more target labels are loaded into the label register of each of the PMU counters. The hardware components of the data processing system may be configured to send one or more events and one or more associated labels per cycle.

A set of an associated target event and target label may be used to configure one PMU counter to monitor one aspect of the performance of the processing of the neural network. The PMU may comprise a plurality of PMU counters which can each be configured using a set of an associated target event and target label. A plurality of aspects of the performance of the processing of the neural network can be monitored by using a plurality of sets to configure a plurality of counters for one execution of the labeled instructions. Increasing the number of PMU counters comprising the PMU, however, increases the chip space the PMU consumes. There may not be enough PMU counters comprising the PMU to execute the labeled instructions only once and perform the entire performance monitoring task contained in the PMU configuration settings. As demonstrated in step 302 of the flow diagram, the performance monitoring software package may determine from the PMU configuration settings how many times the PMU needs to be configured and how many times the labeled instructions will need to be executed to perform the entire performance monitoring task. This can be determined from the plurality of sets of associated target events and target labels which correspond to aspects of the neural network which are to be monitored during processing.

At step 303 of the flow diagram, the PMU configuration settings will be used to configure the PMU counters of the PMU for a first execution of the labeled instructions. As discussed previously this may be achieved by loading one or more target events and/or one or more target labels into the target register and/or event registers of the plurality of PMU counters. At step 304 of the flow diagram, the labeled instructions are executed. As units of work contained within the labeled instructions are executed by the hardware components of the data processing system, data is generated corresponding to an event and associated label by the hardware component indicating the unit of work being processed and is sent to the PMU. It should be noted that there may be a plurality of processes occurring at the same time with a plurality of associated events and labels being sent to the PMU at the same time. The associated event and label are transferred to all PMU counters. The associated event and label are then compared to the event register and label register. If the event register and label register contain the received event and label, then the counter value is increased. In this way the performance of the processing of the neural network by an NPU can be monitored. Events and labels generated from processes occurring in the hardware components of the data processing system are monitored and counter values increased according to the configuration of the PMU until the execution of the labeled instructions is terminated.

At step 305 of the flow diagram, the execution of the labeled instructions has terminated, and intermediate analytics are carried out. The intermediate analytics may be determined using a performance monitoring software package by reading the counter values of the PMU counters comprising the PMU. Intermediate analytics may be carried out every time the labeled instructions execution is terminated. During intermediate analytics the counter values may be saved to storage circuitry before being set to another counter value such as zero. The saved counter values may be used for further analytics. Setting the counter value to zero of a PMU counter resets the counter value. Reinitializing the counter values comprises setting all of the PMU counters contained in the PMU's counter values to zero. Intermediate analytics may comprise displaying the counter values of the respective PMU counters to the user via user interface software such as a GUI.

If it was previously determined using the PMU configuration settings that in order to complete the performance monitoring task the labeled instructions need to be executed again with the PMU being reconfigured then the data processing system would return to step 303 of the flow diagram and reconfigure the PMU counters as previously discussed using the sets of associated target events and target labels which haven't previously been used to configure the PMU counters. The data processing system then returns to step 304 of the flow diagram and the labeled instructions are executed again and the performance monitoring process repeated. Once the execution is terminated, intermediate analysis may be carried out at step 305. These steps are repeated as many times as the PMU is configured to carry out the entire performance monitoring task. As demonstrated by step 306 after the execution has terminated on the final execution run of the labeled instructions, final analytics are carried out. The final analytics may be determined by the analytics software of the performance monitoring software package using the current counter values and those stored in storage circuitry. Final analytics may comprise displaying the counter values of the respective PMU counters in addition to those stored in storage circuitry to the user via user interface software such as a GUI.

Figure 4:
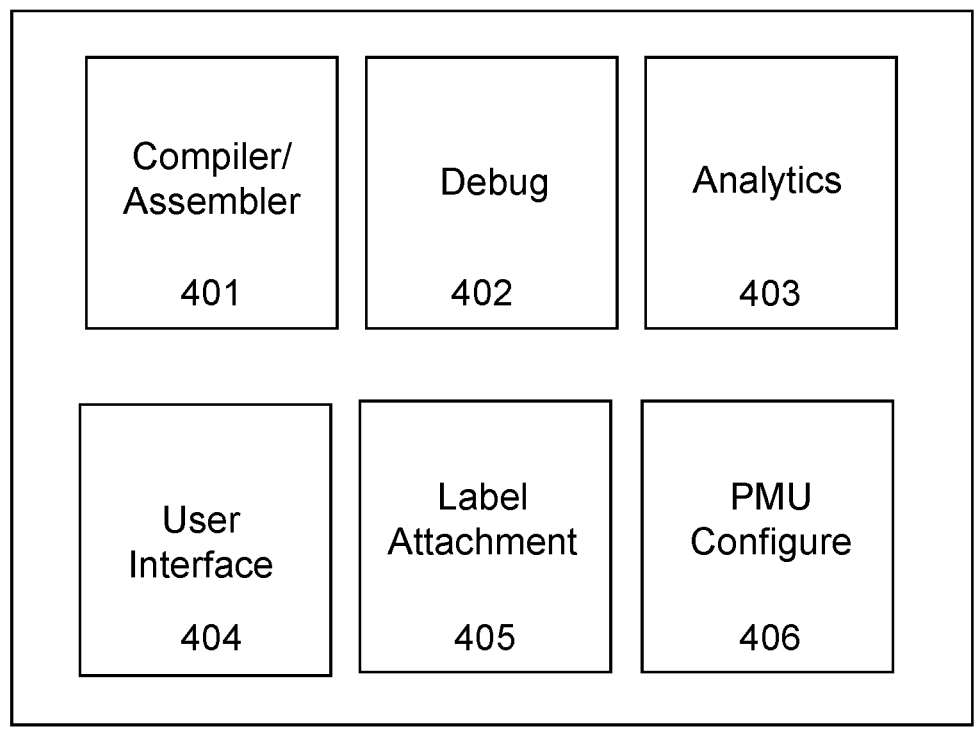
FIG. 4 illustrates a block diagram for a performance monitoring software package in accordance with an example of the present disclosure.

FIG. 4 illustrates a block diagram for a performance monitoring software package in accordance with an example of the present disclosure. The performance monitoring software package comprises computer-readable instructions which perform one or more functions when executed. Functions include but are not limited to assigning labels to instructions based on a selected feature, generating configuration settings from the PMU configuration settings and selecting features to assign labels to instructions. The computer-readable instructions comprising the performance monitoring software package may be considered a first set of computer-readable instructions while the computer-readable instructions to implement at least a portion of a neural network may be considered a second set of computer readable instructions.

The performance monitoring software package 400 comprises compiler/assembler 401, debug 402, analytics 403, user interface 404, label attachment 405 and PMU configure 406 software. The compiler/assembler software 401, as discussed previously compiles or assembles received unlabeled instructions to generate labeled instructions comprising units of work to be executed by the hardware contained in the data processing system. In one example, the compiler/assembler software 401 also includes label attachment functionality in order to attach labels to the units of work originating from features of the neural network. The debug software 402 determines errors in the received unlabeled instructions or labeled instructions. These errors may be highlighted and indicated to the user using the user interface software 404. The analytics software 403 determines analytics based on counter values either contained in the PMU or stored in storage circuitry. These analytics demonstrate the performance of the neural network and can be used to determine improvements to be made to the instructions. The analytics may be able to determine feedback for the user in the form of suggestions for how to improve the instructions which can be relayed to the user via the user interface software 404.

The user interface software 404 such as a GUI may be used to relay information related to any of the performance monitoring software package or data processing system to the user. It may also allow the user to generate PMU configuration settings by indicating one or more features of the neural network and events generated by hardware components of the data processing system during the processing of the neural network. This may be achieved by allowing the user to select parts of the unlabeled instructions or labeled instructions which are to be monitored using the user interface 404. The label attachment software 405 determines the labels to be attached to the feature of the neural network and then attaches the labels to the units of work related to that feature. In a performance monitoring task, there may be a plurality of features of the neural network which have been selected to be monitored. The label attachment software 405 will determine a plurality of labels and how they are attached to the units of work by considering the plurality of features selected and how many times the labeled instructions will be executed. The label attachment software 405 may determine the most efficient way of attaching labels to the units of work. For example, if a performance monitoring task only includes one aspect of the neural network to monitor and this corresponds to monitoring DMA read beats for the entire neural network then the label attachment software will determine that only one unique label is to be attached to every unit of work. The label attachment software 405 may have access to the PMU configuration settings to allow it to determine the allocation of labels to units of work. The PMU configure software 406 determines configuration data using PMU configuration settings and uses the configuration data to configure the PMU counters comprising the PMU. The PMU configure software also determines how many times to execute the labeled instructions to perform the performance monitoring task. The PMU configure software does this by determining one or more target events and/or one or more target labels to be loaded into the event registers and/or label registers of the plurality of PMU counters every execution run. The PMU configure software 405 may have access to the label attachment software 405 to allow it to determine how to configure the PMU counters.

Figure 5:
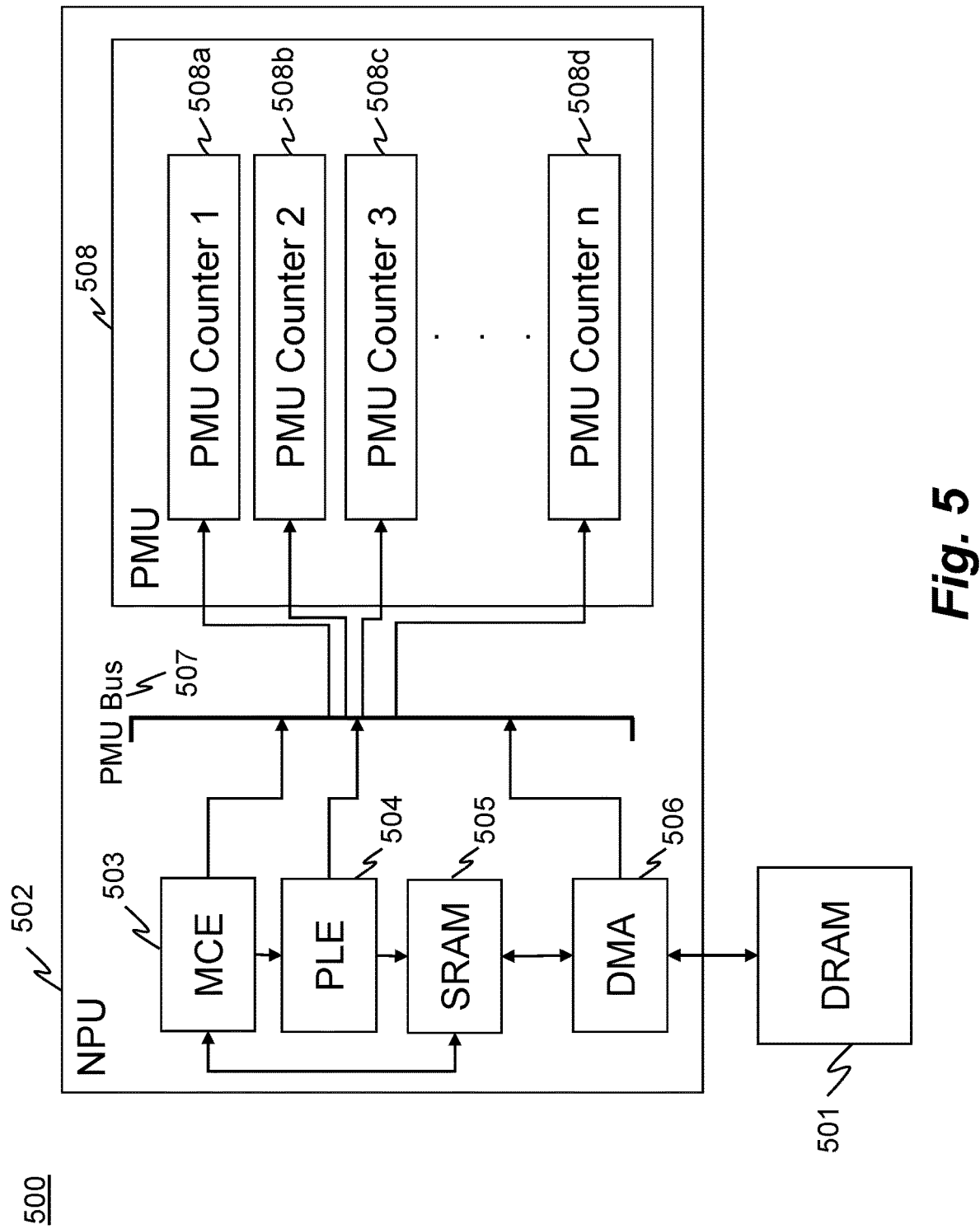
FIG. 5 illustrates a schematic block diagram representing a data processing system comprising an NPU and a PMU in accordance with an example of the present disclosure.

FIG. 5 illustrates a schematic block diagram representing a data processing system comprising an NPU and a PMU in accordance with an example of the present disclosure. In the present example the data processing system 500 comprises storage circuitry such as DRAM 501 and an NPU 502. The DRAM may store data associated with the neural network such as the unlabeled instructions, labeled instructions, IFM, filter and OFM. The DRAM 501 may also store a performance monitoring software package. The DRAM 501 may also store data associated with the PMU such as labels, events, PMU configuration settings and counter values. The NPU 502 comprises an MCE 503, PLE 504, static random access memory (SRAM) 505, a DMA 506, PMU bus 507 and PMU 508. The NPU 502 is configured with hardware components to process the neural network. In the present example the NPU 502 contains specialized circuitry for a CNN but may be arranged in accordance with a range of neural network architectures. The hardware components are instructed to process the neural network through the units of work contained within the labeled instructions. The labeled instructions may be executed by processing circuitry found externally to the NPU 502 but within the data processing system such as a CPU or internally such as a neural control unit (NCU) which generates control data for the hardware components such as the MCE 503 and PLE 504. A CPU external to the NPU but contained within the data processing system may execute the performance monitoring software package by generating control data for hardware components contained within the data processing system. It should be noted that alternative processing circuitry such as a GPU may also be contained within the data processing system. The NPU may only process a portion of the neural network, with other portions being processed by other computation processor types such as a CPU.

The MCE 502 is configured to perform convolutions between an IFM and a filter to generate an OFM in accordance with the units of work contained within the labeled instructions. It should be noted that convolutions may be broken down. For example, an IFM may be broken down into a plurality of IFM stripes with each IFM stripe corresponding to a unit of work. In one example, the IFM comprises 6×6×1 elements corresponding to the height, width and depth of the IFM. The IFM is split into IFM stripes which comprise portions of the IFM. The IFM is split into IFM Stripe 1 which comprises the top 3×6×1 elements of the IFM and IFM stripe 2 which comprises the bottom 3×6×1 elements of the IFM. The unit of work may involve convolving an IFM stripe with the filter to generate an OFM stripe which is a portion of the OFM. When all IFM stripes are convolved with the filter to generate the OFM stripes, the OFM stripes may be combined or accumulated to generate the OFM. It should also be noted that the plurality of IFM stripes originating from the same IFM may not be convolved consecutively. It should also be noted that a processing tile may comprise a plurality of related IFM stripes from a plurality of layers of the neural network. In one example, for a first layer of a neural network, a first IFM stripe is convolved with a filter to generate a first OFM stripe. In the next layer of the neural network, the first OFM stripe becomes a further IFM stripe. The first IFM stripe, input to the first layer, and the further IFM stripe, input to the second layer, are related IFM stripes as the further IFM stripe comprises the processed elements of the first IFM stripe. The processing tile may be utilized to monitor processes related to the first IFM stripe through a plurality of subsequent layers of the neural network.

There may also be a plurality of MCEs 503 contained within the NPU allowing for parallel processing of convolutions. The PLE 504 is arranged to perform additional processing operations on IFM, OFM, IFM stripes or OFM stripes including pool operations and applying activation functions and can also be programmed to perform a number of operations on different layers of the CNN, allowing for a broad range of CNN architectures to be implemented. It should be noted that the PLE 504 may have its own set of labeled instructions indicative of units of work contained within the labeled instructions separate to instructions for other hardware components such as the MCE 503. In this way the processes of the PLE 504 an MCE 503 may be executed in parallel. The PLE 504 and the MCE 503 are arranged to transfer data between one another and the SRAM 505. The SRAM 505 may store data which is to be read to or written from the MCE 503 and PLE 504. The SRAM 505 may comprise a data buffer. The DMA 506 facilitates the reading and writing of data between the external DRAM 501 and SRAM 505 via the use of a main data channel. The PMU bus 507 connects the hardware components of the NPU 502 to the PMU 508 allowing the transfer of events and labels from the MCE 503, PLE 504 and DMA 506. The PMU 508 comprises a plurality of PMU counters 508a-508d. The PMU bus 507 ensures that the associated labels and events sent to the PMU are received by all PMU counters 508a-508d.

Figure 6:
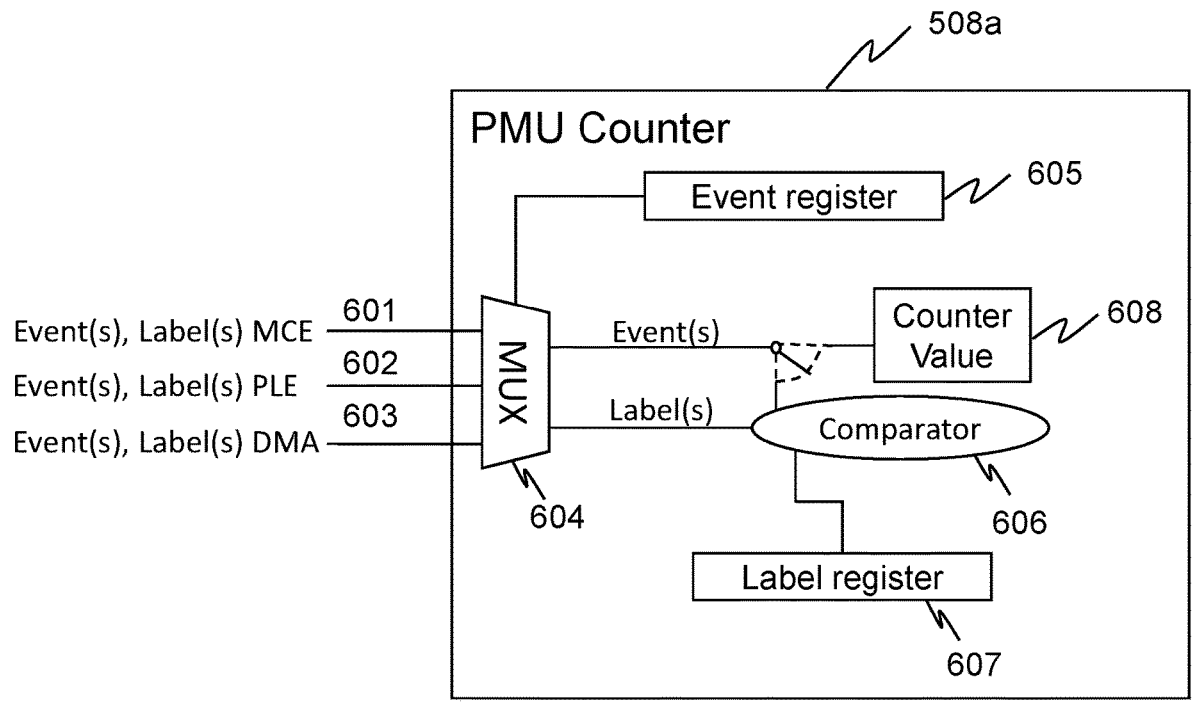
FIG. 6 illustrates a schematic block diagram representing in further detail a PMU counter of FIG. 5 arranged in accordance with an example of the present disclosure.

FIG. 6 illustrates a schematic block diagram representing in further detail a PMU counter of FIG. 5 arranged in accordance with an example of the present disclosure. In the present example, the plurality of PMU counters 508a-508d contained within the PMU 508 are configured components-wise, the same. As discussed previously, upon the execution of a process by a hardware component, an event and associated label will be sent to the PMU 508 and received by all PMU counters 508a-508d. The NPU 502 may be configured for parallel processing, in which case a plurality of events and labels may arrive at the PMU counter 508a as a plurality of units of work are processed during the same cycle. A single unit of work when processed by the hardware components of the NPU 502 may also generate a plurality of events associated with a plurality of labels. The PMU counter 508a may be configured to determine whether the plurality of events and associated labels originate from a single unit of work or a plurality of units of work. This may be indicated by data channels originating from each of the hardware components and connected to each PMU counter 508a. In the present example, each PMU counter 508a has an MCE data channel 601, PLE data channel 602 and DMA data channel 603 with each channel sending data containing the associated one or more events and/or one or more labels which originate from the respective hardware components. Each channel will send data to the plurality of PMU counters every cycle if a process has occurred in that hardware component. If a process has not occurred in that hardware component, in one example, no data will be sent in the corresponding data channel that cycle. In another example, an event indicating that no processing has occurred in the hardware component for the current cycle may be sent. In a further example, an event indicating a stall cycle has occurred may be sent when a hardware component has not carried out a process. The stall cycle may occur due to a delay in an execution of a unit of work in order to resolve a hazard. Hazards occur when the next unit of work cannot execute in the current cycle, as executing the unit of work may lead to incorrect computation results. Every cycle, the data sent by the channel in the last cycle will be deleted. The data channels will be connected to a multiplexer (MUX) 604 where the event register 605 of the PMU counter 508*a* is the selector. The event register 605 selects the data contained in the data channel to be transferred past the MUX 604 by selecting the data channel which contains the event which matches the target event loaded into the event register 605. If there are a plurality of events loaded into the event register 605, the PMU counter 508*a* may be configured so that a data channel may only be selected if all of the plurality of events are present in the data of that data channel. The PMU counter 508*a* may also be configured to select a data channel which contains one or more of the plurality of target events loaded into the event register. If none of the data channels contain the one or more events loaded into the event register, then no data will be transferred past the MUX 604 for that cycle.

It should be noted that if the data channel is selected then the entire data in the data channel is transferred beyond the MUX which includes one or more events and/or one or more labels. When the data is transferred beyond the MUX 604 it may be split into two data channels, one corresponding to events and the other corresponding to labels. The events data channel is connected to the counter value with a switch in between. When the switch is closed, the data in the event channel triggers a counter value change. A counter value change may include increasing the counter value by one. When the switch is open then the event cannot trigger the counter value to change and therefore, the event is not counted. The switch is connected to a comparator 606. The comparator 606 is configured to compare the signals from the label data channel transferred from the MUX 604 with the signal of the target labels contained within the label register 607. If the label data channel contains one of the labels which matches with the one or more target labels loaded into the label register then the PMU counter 508*a* may be configured such that the comparison of the signal from the label data channel and label register 607 will result in the comparator generating a signal that closes the switch, allowing the data in the event data channel to increase the counter value 608. In one example, a plurality of target labels is loaded into the label register and the PMU counter 508*a* is configured such that the comparator 606 closes the switch when all of the plurality of labels matches all of the plurality of target labels loaded into the label register 607. In another example the comparator 606 closes the switch when one or more of the plurality of labels in the label data channel matches one or more of the plurality of target labels contained in the label register 607. In a further example, the label register 607 may not contain a target label, in which case the switch may be closed and any event in the event data channel transferred by the MUX will trigger a counter value increase. The PMU counter 508*a* and other PMU counters 508*b*-508*d* of the PMU are configured in this way to count units of work related to the events and features of the processing of the neural network, ensuring that the performance is monitored only for events and features of interest.

The PMU may be configured to trigger an interrupt at a certain PMU counter value to the processing circuitry of the data processing system such as a CPU. This interrupt may be used to signal to the user that a PMU counter has reached a certain counter value along with what aspect of the neural network the PMU counter was monitoring, using user interface software such as a GUI. The interrupt may also be used to trigger a change in the PMU configuration. For example, an interrupt may be sent if a counter value is close to exceeding the maximum value it is configured to store. The counter value may be stored in storage circuitry and the counter value changed to a lower counter value to allow for continued monitoring. Once the execution of the labeled instructions has terminated and analysis of the run is performed, the analytics software will know to add the stored counter value to the current counter value. It should be noted that this process will be executed in a way that will not stall the processing of the neural network by the NPU.

Figure 7:
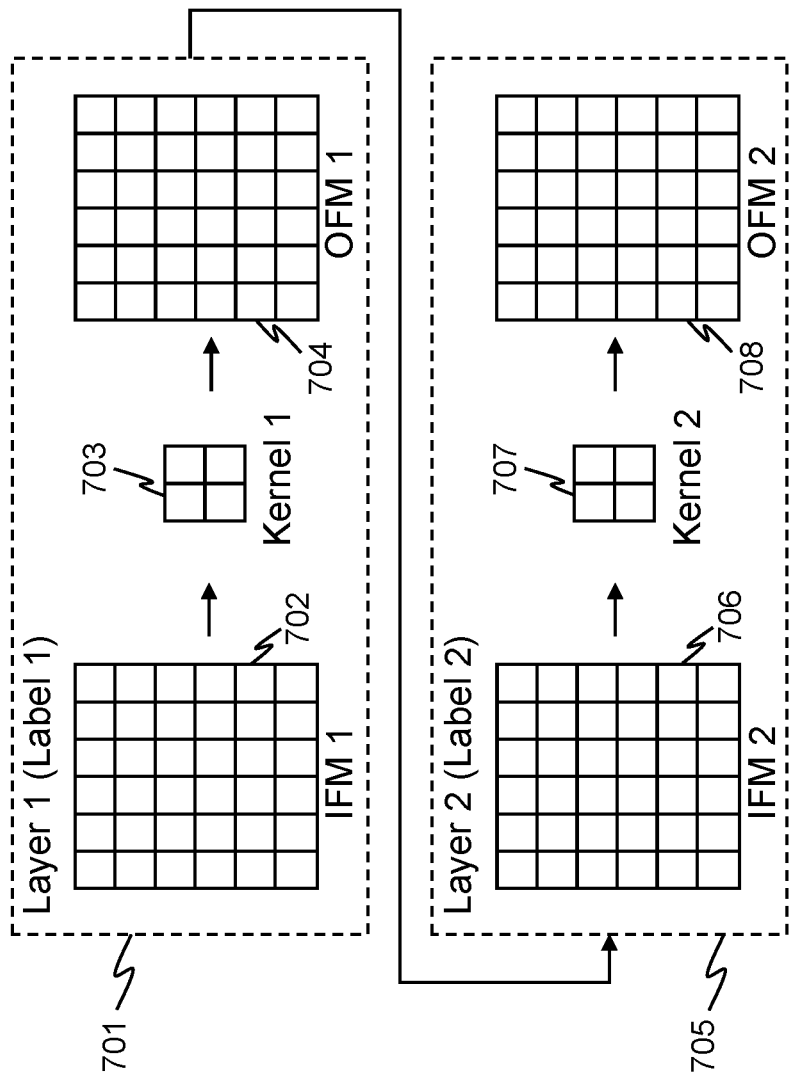
FIG. 7 illustrates a diagram of a set of instructions to implement a neural network in accordance with an example of the present disclosure.

FIG. 7 illustrates a diagram of a set of unlabeled instructions to implement a neural network in accordance with an example of the present disclosure. The Figure diagrammatically represents two convolution layers of the neural network contained within unlabeled instructions. Layer 1 701 is a convolution layer of the neural network and comprises IFM 1 702 which is convolved with kernel 1 703 to generate OFM 1 704. It should be noted that this convolution occurs with SAME padding where zero elements are added to the edges of IFM 1 702 to generate OFM 1 704 with the same dimensions as IFM 1 702. Layer 2 705 is a convolution layer of the neural network where OFM 1 704 of layer 1 704 is IFM 2 706 of layer 2 705. Layer 2 705 comprises IFM 2 706 which is convolved with kernel 2 707 to generate OFM 2 708. This convolution also occurs with SAME padding to ensure OFM 2 708 is generated with the same dimensions as IFM 2 706. In the present example the selected feature of the neural network in which labels have been assigned to is the layers of the neural network. Layer 1 701 is assigned label 1 and layer 2 705 is assigned label 2.

Figure 8:
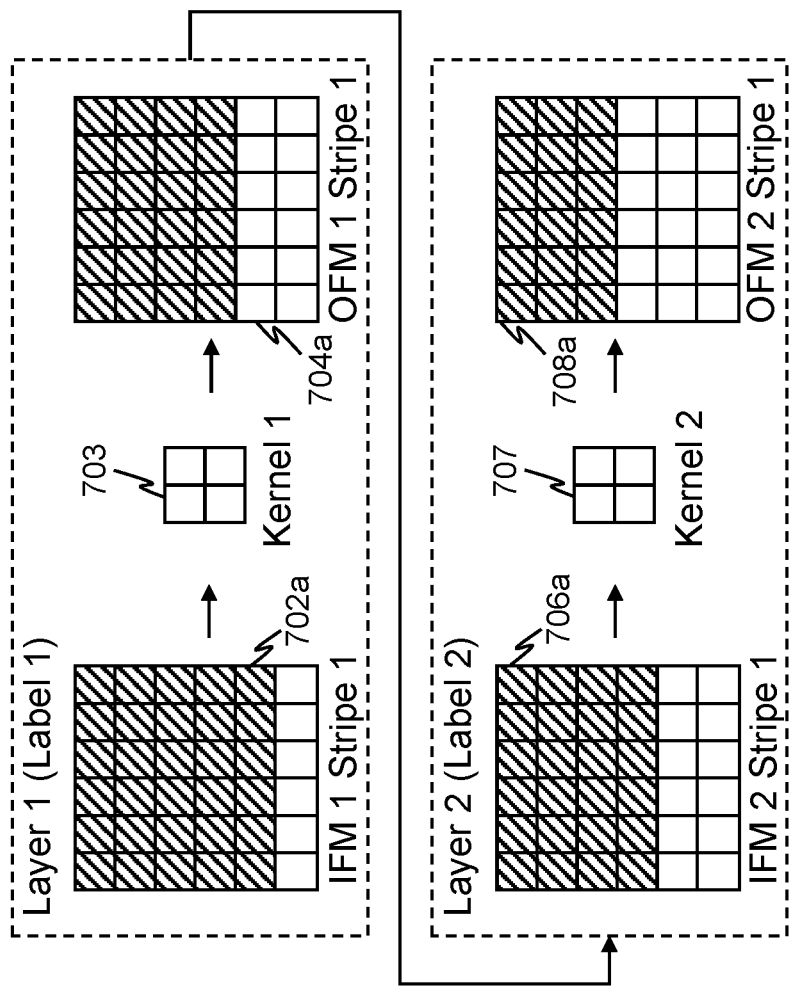
FIG. 8 illustrates a diagram representing a method of an NPU executing the set of instructions of FIG. 7 in accordance with an example of the present disclosure.

FIG. 8 illustrates a diagram representing a method of an NPU executing the set of instructions of FIG. 7 in accordance with an example of the present disclosure. As discussed previously, when the unlabeled instructions to implement the neural network are compiled or assembled by a compiler or assembler, labeled instructions are generated comprising an order in which units of work will be processed by the hardware components of the data processing system. The order of the units of work may be determined by the compiler or assembler, or other software contained within the performance monitoring software package by modelling the most efficient execution path for the data processing system to process the neural network. The diagram demonstrates units of work which are to be executed by the processor when the unlabeled instructions of FIG. 7 are compiled. In the case of a convolution layer, a unit of work may be an IFM stripe convolved with a kernel to generate an OFM stripe. This allows for the convolution to be broken down into more manageable parts for the hardware components of the data processing system, optimizing the power consumption of the data processing system during processing. In the present example the labeled instructions comprise four units of work in order to process the two convolution layers. The first and second units of work result in OFM 2 stripe 1 708*a*, which comprises the top half of the elements of OFM 2.

The first unit of work comprises convolving IFM 1 stripe 1 702*a* with kernel 1 703 to generate OFM 1 stripe 1 704*a*. The elements of the respective data which take part in the convolution operation are indicated with shading in FIGS. 8 and 9. The compiler or assembled, will be aware that padding is used during convolution and this information will be used when generating the units of work. In the present example, the compiler or assembler is aware of the elements that will take part in the convolutions to generate half of the elements of OFM 2 stripe 1 708*a*. For the second unit of work, the OFM 1 stripe 1 704*a* of layer 1 is IFM 2 stripe 1 706*a* of layer 2. The second unit of work comprises IFM 2 stripe 1 706*a* being convolved with kernel 2 707 to generate OFM 2 stripe 1. The first unit of work will have label 1 attached to it and the second unit of work will have label 2 attached to it.

Figure 9:
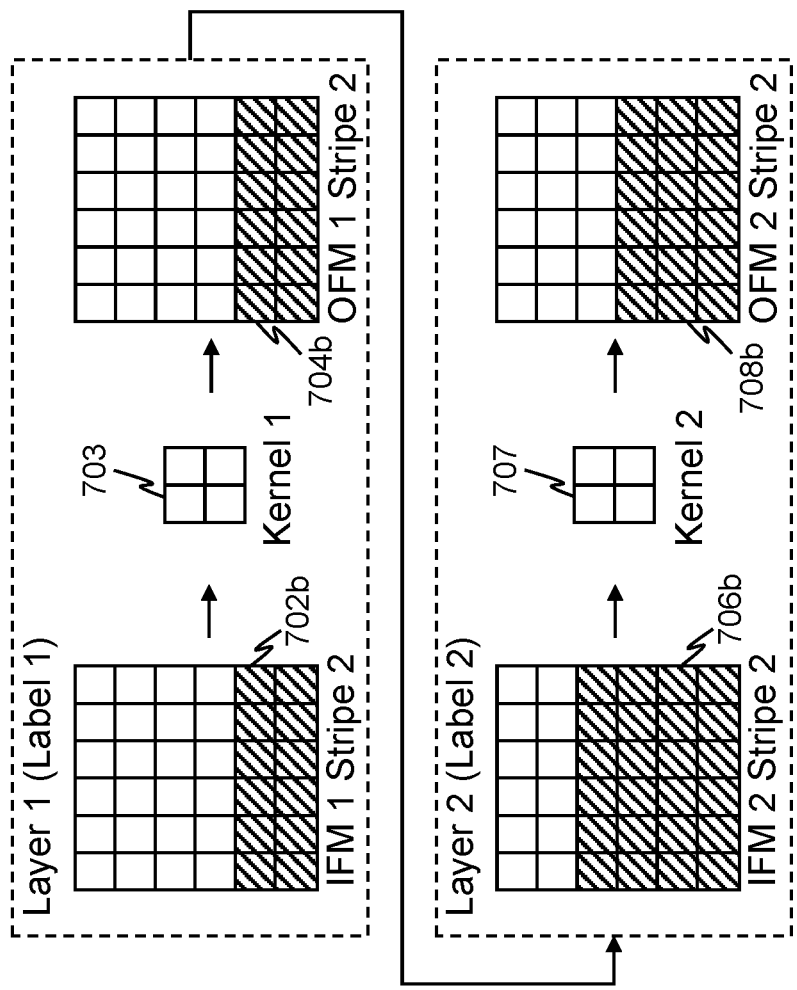
FIG. 9 illustrates a diagram representing further a method of an NPU executing the set of instructions of FIG. 7 in accordance with an example of the present disclosure.

FIG. 9 illustrates a diagram representing further a method of an NPU executing the set of labeled instructions of FIG. 7 in accordance with an example of the present disclosure. The diagram demonstrates the third and fourth unit of work contained within the labeled instructions. The third and fourth unit of work result in OFM 2 stripe 2 708*b*, which comprises the bottom half of elements of OFM 2. The third unit of work comprises convolving IFM 1 stripe 2 702*b* with kernel 1 703 to generate OFM 1 stripe 2 704*b*. The elements of the respective data which take part in the convolution operation are indicated with diagonal lines. Elements of OFM 1 stripe 2 704*b* are then used in IFM 2 stripe 2 706*b*. The elements of IFM 2 stripe 2 which were not generated in the third unit of work, were previously generated in the first unit of work. The labeled instructions will include instructions for reading the data which will have been saved in storage circuitry from this process. The fourth unit of work will comprise IFM 2 stripe 2 706*b* being convolved with kernel 2 707 to generate OFM 2 stripe 2 708*b*. The third unit of work will have label 1 attached to it and the fourth unit of work will have label 2 attached to it. The combination of the first, second, third and fourth unit of work being processed in this way will result in layer 1 and layer 2 of the neural network being processed by the data processing system.

In another example, the selected feature for the assignment of labels may be a processing tile. The labels in this case may be assigned to associated units of work throughout layers of the neural network. The first and second units of work in the present example would in this case share the same unique label such as label 1 as the same data starting with IFM 1 stripe 1 702*a* is processed through a plurality layers of the neural network. The third and fourth units of work in the present example would in this case share the same unique label, such as label 2, also as the same data starting with IFM 1 stripe 2 702*b* is processed through a plurality layers of the neural network.

In a further example, the selected feature for the assignment of labels may be a processing pipeline containing a series of neural network operations. The labels in this case may be associated with consecutive processes as they are written in the unlabeled instructions. In the present example, the unlabeled instructions demonstrate that there are two convolutions one after another so the pipeline may comprise layer 1 and layer 2. This would result in the same unique label being assigned to the units of work relating to layer 1 and layer 2. In this case the first, second, third and fourth unit of work may have label 1 assigned to them.

The disclosure discussed in the above examples has a number of advantages. The use of both labels and events allows for the indirect indication of when an event should be counted by a PMU counter, subverting the need for supervisory software to reconfigure the PMU to start stop and resume counting for various units of work. This means that there are no stalls for reconfiguration during the execution of the labeled instructions and no change in the performance behavior of the NPU if different features, such as layers, processing pipelines or processing tiles of the neural network are monitored. This makes the execution of the labeled instructions repeatable allowing for different aspects of the neural network to be monitored, compared and contrasted by analysis software during a performance monitoring task. This also prevents the need for a large number of PMU counters or a large storage capacity for the storage of a number of labels to measure every aspect of the neural network in a performance monitoring task in one execution of the compiled code. Repeating the executed compiled code for performance tasks allows the PMU configuration to have a reduced number and storage capacity of components such as PMU counters, event registers and label registers reducing the amount of chip space the PMU will take up. The user is able to monitor aspects of the processing of the neural network contained within the source code without needing to be aware of how the compiled code has determined the order of the units of work.

The disclosure demonstrates a flexibility of selecting different features of the neural network to be monitored during the performance monitoring. Monitoring a layer of the neural network allows for the user to determine that the instructions relating to layers of the neural network can be optimized further. Monitoring a processing tile of the neural network, which is made up of only some of the units of work which make up each of a plurality of layers of the neural network, allows for the user to identify in further detail the specific part of the layer(s) which may be causing issues when a neural network is being subject to sequences of operations using a processing tile-based approach. Monitoring a processing pipeline of operations contained within the neural network allows for the monitoring of related operations in the unlabeled instructions. For example, the poor behavior of one layer of the neural network may be caused by an earlier related operation.

The analytics software contained within the performance monitoring software package allows for the determination of how long it takes to perform certain operations, how quickly the neural network can be processed in its entirety and how much computational power it consumes while doing so, allowing for the optimization of these factors. By monitoring the behavior of components related to the storage circuitry of the data processing system such as a DMA, the scheduling of memory accesses to read or write data can be optimized so as to make these accesses at optimal points in the processing of the neural network. The user may be able to determine, using performance monitoring, how to limit the number of times data is read from and written into storage circuitry. Providing these analytics to a user via the utilization of user interface software helps the user to decide how to design the neural network. The user can determine the effect on the speed of processing and computation power consumed by changing various parameters of the neural network such as the type of functions used in various operations, number of nodes, layers and overall size of the neural network and monitoring their effects.

The method of performance monitoring disclosed allows for the utilization of parallel processing. In one example, the plurality of PLE and plurality of MCE hardware components each have their own set of units of work to be processed which can be processed simultaneously. The use of the event and associated label allows for the hardware components to indicate to the PMU what feature of the neural network each component is processing.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A computer implemented method, performed in a data processing system comprising a performance monitoring unit, the method comprising:
   receiving a set of unlabeled computer-readable instructions to be executed by the data processing system to implement at least a portion of a neural network;
   assigning one or more performance-monitoring labels to one or more instructions of the set of unlabeled instructions based upon one or more features of the neural network to generate one or more labeled instructions, each labeled instruction comprising a unit of work to implement the at least a portion of the neural network;
   processing, by one or more hardware components of the data processing system, the units of work in accordance with the labeled instructions, wherein an event is triggered by the processing of each unit of work; and
   counting, using a counter element of the performance monitoring unit that is operable to count a plurality of events, the number of events that occur in the one or more hardware components of the data processing system and are associated with a performance monitoring label of the one or more performance monitoring labels.

2. The method of claim 1, wherein the method further comprises:
   configuring the performance monitoring unit by:
      storing one or more target events in one or more event registers; and
      storing one or more target labels in one or more label registers; and
   counting one or more events by:
      determining that an event corresponds to the one or more target events stored in the one or more event registers; and
      determining that a performance monitoring label corresponds to the one or more target labels stored in the one or more label registers.

3. The method of claim 1, wherein the method comprises counting, using the counter element of the performance monitoring unit, one or more events relating to active cycles for the one or more hardware components comprising the data processing system.

4. The method of claim 1, wherein the method comprises configuring the performance monitoring unit to count one or more events relating to stall cycles for the one or more components comprising the data processing system.

5. The method of claim 1, wherein the method comprises counting, using the counter element of the performance monitoring unit, one or more events related to one or more storage components of the data processing system.

6. The method of claim 1, wherein the method comprises:
   generating configuration data for a performance monitoring unit, the configuration data being for configuring the performance monitoring unit to count events corresponding to the performance monitoring labels.

7. The method of claim 6, wherein the configuration data comprises:
   one or more target events; and
   one or more target labels.

8. The method of claim 1, wherein the method comprises selecting a processing pipeline containing a series of neural network operations as one of the one or more features of the neural network and comprises assigning one or more performance monitoring labels to instructions associated with that processing pipeline of the neural network.

9. The method of claim 1, wherein the method comprises selecting a layer of a neural network as one of the one or more features of the neural network and comprises assigning one or more performance monitoring labels to instructions associated with that layer of the neural network.

10. The method of claim 1, wherein the method comprises selecting a processing tile of the neural network, which includes a plurality of related units of work which each make up only part of each of a plurality of layers of the neural network, as one of the one or more features of the neural network, and comprises assigning one or more performance monitoring labels to instructions associated with that processing tile of the neural network.

11. A data processing system comprising:
   storage arranged to store:
      a set of computer-readable instructions that, when executed by a processor, perform the steps of:
         receiving a set of unlabeled computer-readable instructions to be executed by the data processing system to implement at least a portion of a neural network; and
         assigning one or more performance-monitoring labels to one or more instructions of the set of unlabeled instructions based upon one or more features of the neural network to generate one or more labelled instructions, each labeled instruction comprising a unit of work to implement the at least a portion of the neural network;
   one or more hardware components for processing the units of work in accordance with the labeled instructions, wherein an event is triggered by the processing of each unit of work;
   a performance monitoring unit; and
   a counter element operable to count a plurality of events wherein the counter element is configured to count the number of events that occur in the one or more hardware components of the data processing system and are associated with a performance monitoring label of the one or more performance monitoring labels.

* * * * *